United States Patent
Shin et al.

(10) Patent No.: US 7,398,021 B2
(45) Date of Patent: Jul. 8, 2008

(54) OPTICAL TRANSMITTER AND PASSIVE OPTICAL NETWORK USING THE SAME

(75) Inventors: Hong-Seok Shin, Suwon-si (KR); Hyun-Cheol Shin, Suwon-si (KR); Seong-Taek Hwang, Pyeongtaek-si (KR); Dae-Kwang Jung, Suwon-si (KR)

(73) Assignee: Samsung Electronics Co., Ltd., Maetan-Dong, Teongtong-Gu, Suwon-Si, Gyeonggi-Do (KR)

( * ) Notice: Subject to any disclaimer, the term of this patent is extended or adjusted under 35 U.S.C. 154(b) by 512 days.

(21) Appl. No.: 11/052,400

(22) Filed: Feb. 7, 2005

(65) Prior Publication Data
US 2005/0276602 A1 Dec. 15, 2005

(30) Foreign Application Priority Data
Jun. 11, 2004 (KR) .................. 10-2004-0042951

(51) Int. Cl.
*H04J 14/00* (2006.01)
(52) U.S. Cl. .................. 398/72; 398/66; 398/67; 398/68; 398/69; 398/70; 398/71; 398/82; 398/79; 398/84; 398/85; 398/87; 398/91; 398/92; 398/94; 398/98; 398/99; 398/100; 398/182; 398/183; 398/192; 398/194; 385/24; 385/37; 385/58; 385/59
(58) Field of Classification Search .............. 398/70, 398/71, 72, 66, 67, 68, 69, 79, 82, 91, 92, 398/100, 182, 84, 85, 192, 87, 194, 95, 98, 398/99, 183; 385/24, 37, 58, 59
See application file for complete search history.

(56) References Cited

U.S. PATENT DOCUMENTS

2005/0286895 A1* 12/2005 Lee et al. ................. 398/79

* cited by examiner

*Primary Examiner*—Hanh Phan
(74) *Attorney, Agent, or Firm*—Cha & Reiter, LLC

(57) ABSTRACT

An optical transmitter including a multi-lambda source to output injection light consisting of a plurality of injection wavelengths in channels, a circulator having a first port, a second port, and a third port, the circulator receiving the injection light at the first port, and outputting the received injection light to the second port, and further receiving signal light at the second port, and outputting the received signal light to the third port, an arrayed waveguide grating having a multiplexing port connected to the second port of the circulator, and a plurality of demultiplexing ports, spectrum-slicing injection light received from the circulator at the multiplexing port into a plurality of injection channels, and outputting the injection channels to the demultiplexing ports and further receiving and multiplexing a plurality of signal channels at the demultiplexing ports, into a signal light, and outputting the signal light to the multiplexing port, and a plurality of reflective semiconductor optical amplifiers connected to the demultiplexing ports of the arrayed waveguide grating, respectively, each of the reflective semiconductor optical amplifiers receiving an associated one of the injection channels, and amplifying the associated injection channel to generate an associated one of the signal channels.

9 Claims, 6 Drawing Sheets

OPTICAL TRANSMITTER AND PASSIVE OPTICAL NETWORK USING THE SAME

CLAIM OF PRIORITY

This application claims priority to that patent application entitled "OPTICAL TRANSMITTER AND PASSVIE OPTICAL NETWORK USING THE SAME," filed in the Korean Intellectual Property Office on Jun. 11, 2004 and assigned Serial No. 2004-42951, the contents of which are hereby incorporated by reference.

BACKGROUND OF THE INVENTION

1. Field of the Invention

The present invention relates to a wavelength division multiplexing (WDM) optical network, and, more particularly, to an optical transmitter used in a WDM optical network, and a passive optical network using the optical transmitter.

2. Description of the Related Art

In WDM passive optical networks (PONs), particular wavelengths are assigned to respective subscribers each having an optical network unit (ONU). Accordingly, such a WDM PON ensures communication security, while being capable of easily accommodating a separate communication service required by a subscriber. Furthermore, PONs allow for the expansion of a subscriber communication capacity and it is also possible to simply increase the number of subscribers by assigning new wavelengths to new subscribers.

Generally, WDM PONs use a double star type topology. In the double star type topology, a remote node is installed in an area where a plurality of subscribers are distributed near one another. The remote node is connected to a central office via a single feeder fiber. The ONU of each subscriber is connected to the remote node by an independent distribution fiber. A multiplexed signal of downstream optical signals from the central office is transmitted to the remote node via the feeder fiber, and then demultipexed by an arrayed waveguide grating (AWG), for example. Thereafter, the downstream optical signals are transmitted to the individual ONUs via the respective distribution optical fibers. Upstream signal channels, i.e., wavelengths, outputted from respective ONUs are transmitted to the remote node, and then multiplexed by the AWG of the remote node. The resultant multiplexed signal of the upstream signal channels, i.e., wavelengths, is transmitted to the central office.

Recently, spectrum-sliced light sources have been actively researched for a wavelength division multiplexing light source. Such a spectrum-sliced light source slices incoherent light having a sufficiently wide wavelength band flat profile, using an optical filter or AWG, to provide a large number of wavelength-divided channels. In this case, it is thus unnecessary to use individual light sources, each respectively having particular oscillation wavelength, and a corresponding wavelength stabilizing device. For such a spectrum-sliced light source, a light emitting diode (LED), a superluminescent diode (SLD), a Fabry-Perot (FP) laser, a fiber amplifier light source, a picosecond pulse light source, etc. have been proposed. For example, injection light of a broad band generated from an incoherent light source such as an LED or fiber amplifier light source may be spectrum-divided using an optical filter or AWG and the resultant spectrum-divided injection channels, i.e., wavelengths, are provided to a reflective semiconductor optical amplifier, which is not provided with any isolator. Thus, the amplified light in the individual channels may be used for transmission of optical signals.

FIG. 1 is a block diagram illustrating an optical transmitter used in a typical PON. FIG. 2 is a diagram depicting waveforms of injection light A, and the signal light B shown in FIG. 1. As shown in FIG. 1, the optical transmitter 100 includes a broadband light source (BSL) 110, a circulator (CIR) 120, an AWG 130, N reflective semiconductor optical amplifiers (RSOAs) 140-1 to 140-N.

The broadband light source 110 outputs injection light A having a flat profile in a sufficiently broad wavelength band into N light beams of wavelengths $\lambda_1$ to $\lambda_N$. (FIG. 2).

The circulator 120 has a first port 120-1 connected to the broadband light source 110, a second port 120-2 connected to a multiplexing port MP of the AWG 130, and a third port 120-3 connected to a transmission link. The circulator 120 receives the injection light A at the first port 120-1, and outputs the injection light A to the second port 120-2. The circulator 120 also receives signal light B at the second port 120-2, and outputs the signal light B to the third port 120-3.

The AWG 130 has N demulitplexing ports $DP_1$ to $DP_N$, in addition to the multiplexing port MP. The demulitplexing ports $DP_1$ to $DP_N$ are connected to the RSOAs 140-1 to 140-N, respectively. For example, the N-th demultiplexing port $DP_N$ is connected to the N-th RSOA 140-N. The AWG 130 spectrum-slices the injection light A inputted to the multiplexing port MP, and outputs the resultant light beams to the demultiplexing ports $DP_1$ to $DP_N$, respectively. The AWG 130 further multiplexes the signal channels, i.e., wavelengths, inputted to the respective demulitplexing ports $DP_1$ to $DP_N$, and outputs a resultant multiplexed signal to the multiplexing port MP. The AWG 130 has wavelength transmission characteristics having periodically repeated free special ranges (FSRs). The AWG 130 has N wavelengths in an arbitrary FSR thereof. That is, the FSR has transmission wavelengths respectively corresponding to the N wavelengths.

The first through N-th RSOAs 140-1 to 140-N receive the first through N-th injection signals on the N channels and output first through N-th signal channels. For example, the N-th RSOA 140-N receives the N-th injection channels, amplifies the injection signal, and outputs the N-th injection signal, which has an increased peak power level. In this case, the N-th signal channel has an N-th wavelength.

In the above-mentioned optical transmitter, however, the injection light outputted from the broadband light source exhibits loss caused by mismatching of spectrums of the AWG and spectrums of the insertion light as well as insertion loss while passing through the AWG because it has a wide and flat profile. Such loss may be in the order of 3 dB. Hence, there is a need in the industry for a means to optically multiplex/demultiplex optical signals without incurring such loss.

SUMMARY OF THE INVENTION

The present invention has been made in view of the above-mentioned problems incurred in the related art, and it is an object of the invention to provide an optical transmitter capable of achieving maximal energy efficiency, and a PON using the optical transmitter.

In accordance with one aspect, the present invention provides an optical transmitter comprising a multi-lambda source to output injection light consisting of a plurality of injection channels, a circulator having a first port, a second port, and a third port, the circulator receiving the injection light at the first port, outputting the received injection light to the second port, and further receiving a signal light at the second port, and outputting the received signal light to the third port, an arrayed waveguide grating (AWG) having a multiplexing port connected to the second port of the circulator, and a plurality of demultiplexing ports, for spectrum-slicing the received injection light provided by the circulator at the multiplexing port into a plurality of injection signals, and providing the injection channels to the demultiplexing ports, and further receiving a plurality of signal channels at the demultiplexing ports and multiplexing the received\signal channels into a signal light, and outputting the signal light to the multiplexing port, and a plurality of reflective semiconductor optical amplifiers connected to the demultiplexing ports of the arrayed waveguide grating, respectively, each of the reflective semiconductor optical amplifiers further receiving an associated one of the injection channels, and amplifying the associated injection channel to generate an associated one of the signal channels.

In accordance with another aspect, the present invention provides a passive optical network comprising a central office including a first multi-lambda source to output upstream injection light consisting of a plurality of upstream injection channels, a first arrayed waveguide grating to receive the upstream injection light, to spectrum-slice the received upstream injection light into upstream injection channels, and to receive and multiplex a plurality of received downstream signal channels into downstream signal light, and a first group of reflective semiconductor optical amplifiers, each to receive an associated one of the upstream injection channels, and to amplify the associated upstream injection channel to generate an associated one of the downstream signal channels and a remote node connected to the central office via a feeder fiber, the remote node including a second arrayed waveguide grating to receive and demultiplex the downstream signal light, into the downstream signal channels and an optical network unit connected to the remote node via a plurality of distribution fibers to receive the respective downstream signal channels.

BRIEF DESCRIPTION OF THE DRAWINGS

The above advantages of the present invention will become more apparent by describing in detail preferred embodiments thereof with reference to the attached drawings in which.

DETAILED DESCRIPTION

Embodiments of the present invention will now be described in detail with reference to the annexed drawings. For the purposes of clarity and simplicity, a detailed description of known functions and configurations incorporated herein are omitted when it may make the subject matter of the present invention unclear.

Figure 3:
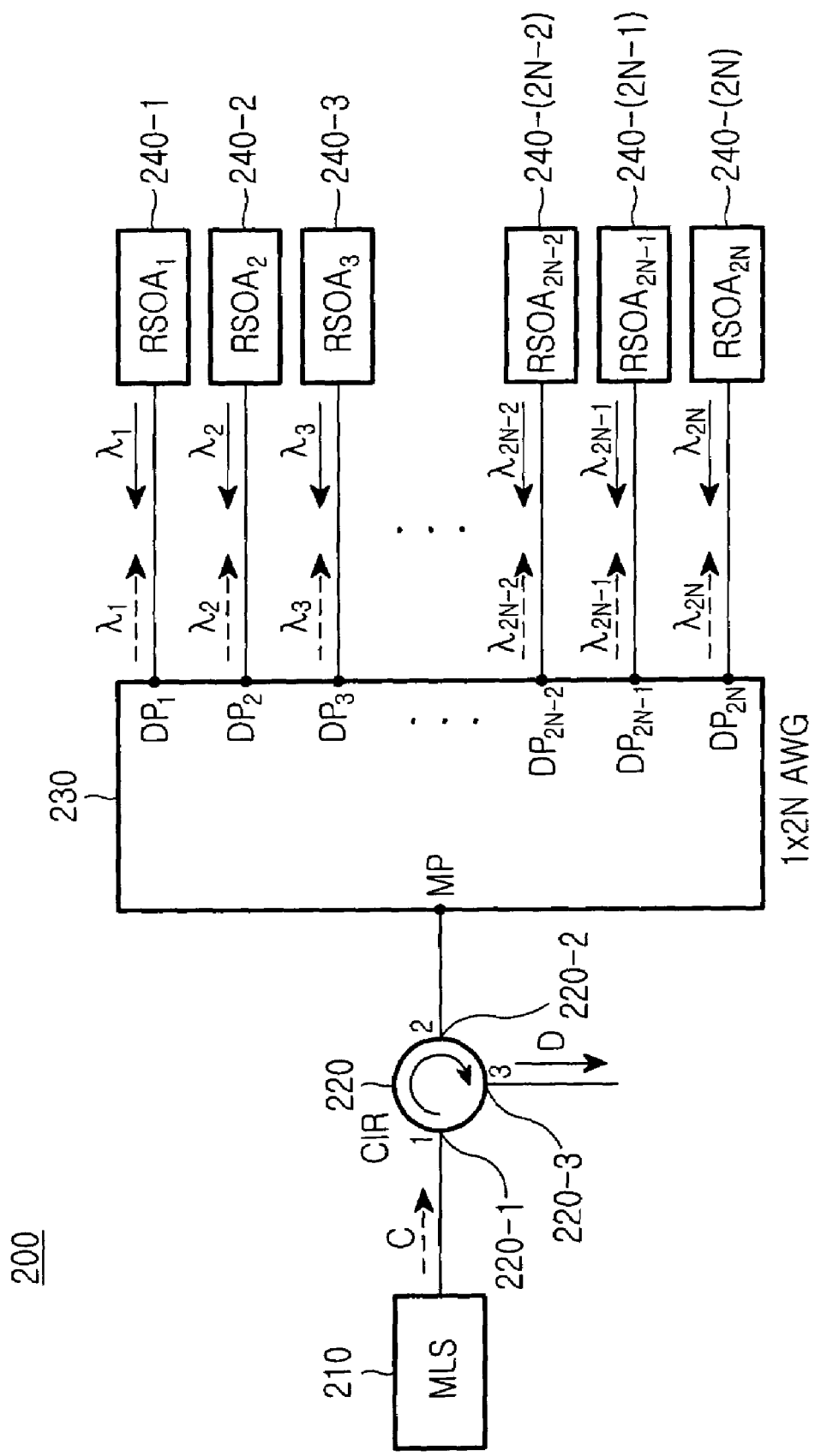
FIG. 3 is a block diagram illustrating an optical transmitter according to an exemplary embodiment of the present invention.
Figure 4:
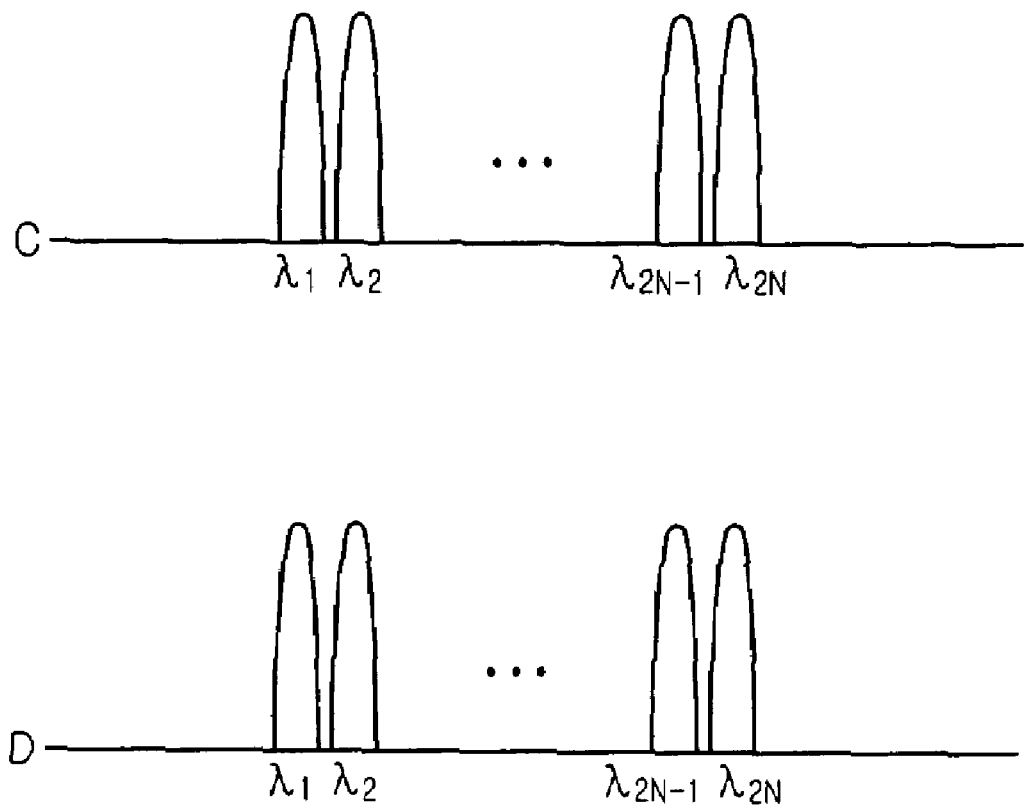
FIG. 4 is a diagram depicting waveforms of injection light C and signal light D of the optical transmitter shown in FIG. 3.

FIG. 3 is a block diagram illustrating an optical transmitter according to an exemplary embodiment of the present invention. FIG. 4 is a diagram depicting waveforms of injection light C and signal light D shown in FIG. 3. As shown in FIG. 3, the optical transmitter 200 includes a multi-lambda source (MLS) 210, a circulator (CIR) 220, an arrayed waveguide grating (AWG) 230, and 2N reflective semiconductor optical amplifiers (RSOAs) 240-1 to 240-2N.

The multi-lambda source 210 outputs injection light C consisting of 2N injection channels. In this case, the injection channels are represented by different wavelengths $\lambda_1$ to $\lambda_{2N}$. For example, the N-th injection channel has a wavelength $\lambda_N$. The multi-lambda source 210 may be a multi-lambda laser, an incoherent multi-lambda source using an erbium-doped fiber amplifier (EDFA) and an AWG, or a Fabry-Perot laser diode.

The circulator 220 has a first port 220-1 connected to the multi-lambda source 210, a second port 220-2 connected to a multiplexing port MP of the AWG 230, and a third port 220-3 connected to a transmission link. The circulator 220 receives the injection light C at the first port 220-1, and outputs the injection light C to the second port 220-2. The circulator 220 also receives signal light D at the second port 220-2 to the third port 220-3.

The AWG 230 has 2N demulitplexing ports $DP_1$ to $DP_{2N}$, in addition to the multiplexing port MP. The demulitplexing ports $DP_1$ to $DP_{2N}$ are connected to the RSOAs 240-1 to 240-2N, respectively. For example, the N-th demultiplexing port $DP_N$ is connected to the N-th RSOA 240-N. The AWG 230 spectrum-slices the injection light C inputted to the multiplexing port MP, and outputs the resultant light beams to the demultiplexing ports $DP_1$ to $DP_{2N}$, respectively. The AWG 230 further multiplexes the 2N signal channels inputted to the demulitplexing ports $DP_1$ to $DP_{2N}$, and outputs the resultant multiplexed signal to the multiplexing port MP. The AWG 230 has wavelength transmission characteristics having periodically repeated free special ranges (FSRs). The AWG 230 has 2N wavelengths in an arbitrary FSR thereof. That is, the FSR has transmission wavelengths respectively corresponding to the 2N wavelengths. Also, the transmission spectrums of the AWG 230 match the spectrums of the injection light C, respectively. Accordingly, there is no loss caused by mismatching of spectrums. That is, each transmission line width of the AWG 230 is equal to or larger than the line width of each injection channel.

The first through 2N-th RSOAs 240-1 to 240-2N receive the first through 2N-th injection channels, respectively, and output first through 2N-th signal channels, respectively. For example, the N-th RSOA 240-N receives the N-th injection channel, amplifies the N-th injection channel, and outputs the N-th signal channel, which has an increased peak power level. In this case, the N-th signal channel has an N-th wavelength. In order to provide a lower half-width limit to the N-th signal channel, it is desirable for the N-th RSOA 240-N to operate in a saturated state.

Figure 1:
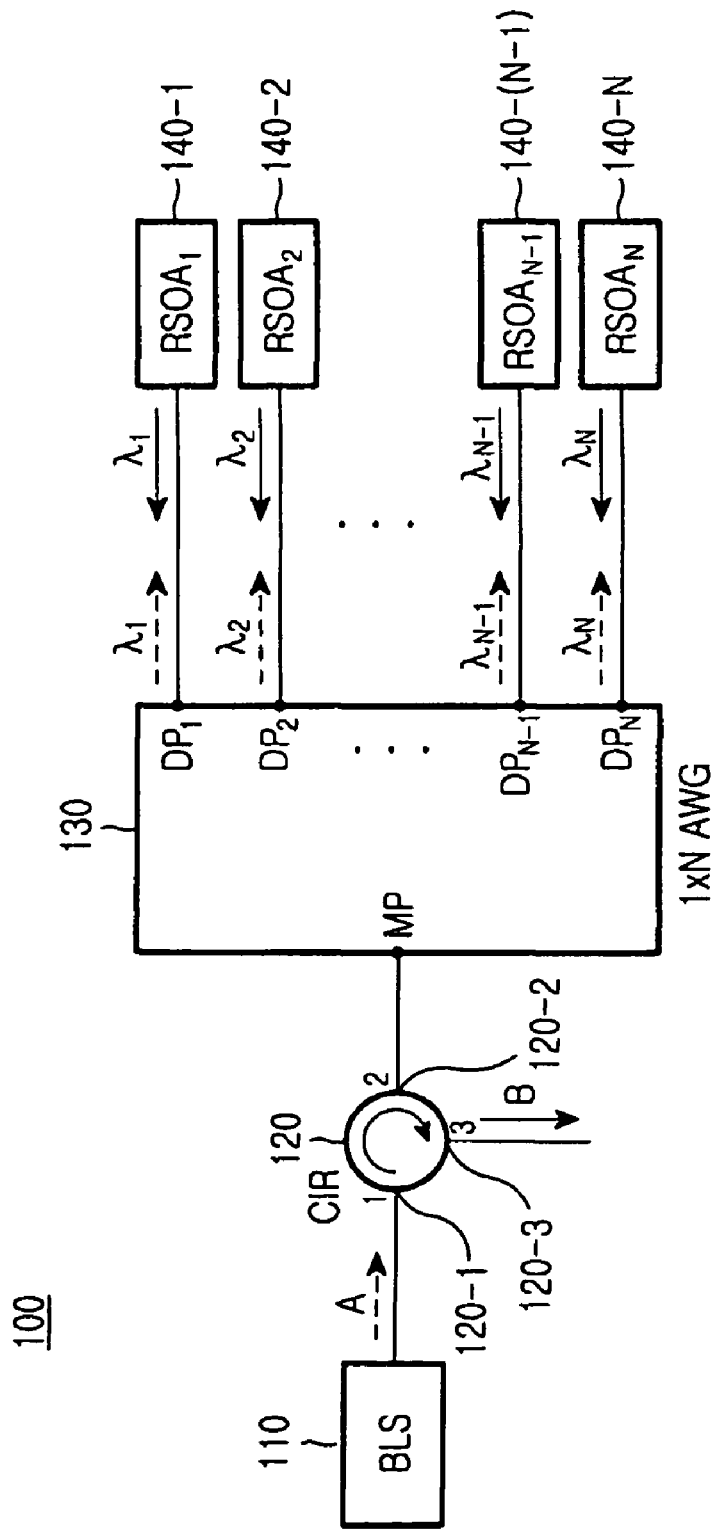
FIG. 1 is a block diagram illustrating an optical transmitter used in a typical PON.
Figure 2:
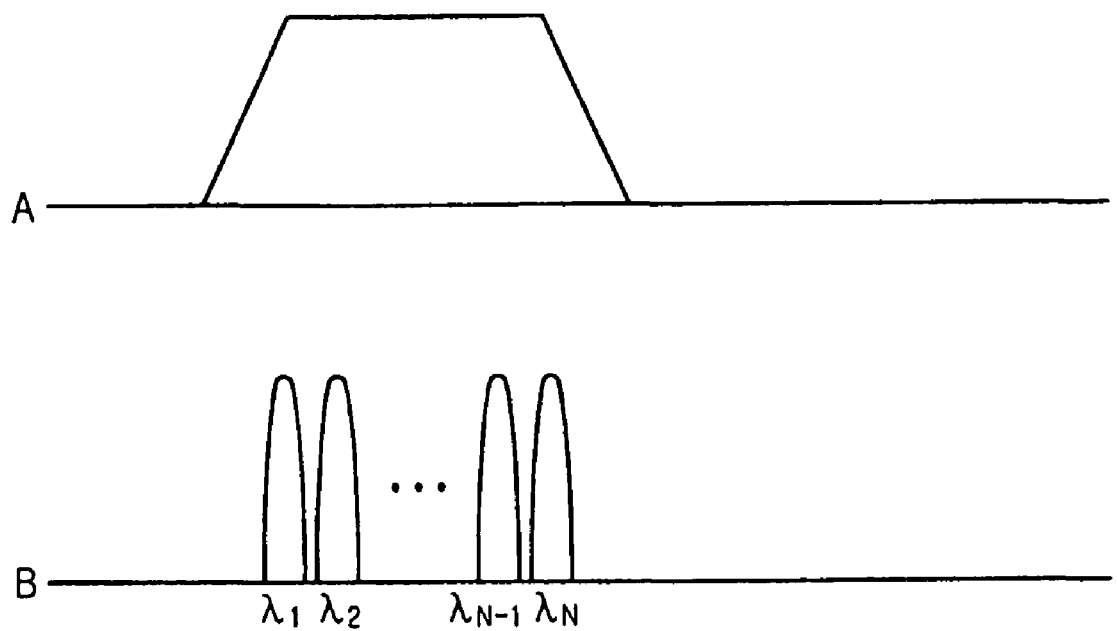
FIG. 2 is a diagram depicting waveforms of injection light A and signal light B of the optical transmitter shown in FIG. 1.

As compared to the typical optical transmitter 100 of FIG. 1, the optical transmitter 200 having the above-described configuration can output 2N channels under the condition in which the same injection light power is used. The typical optical transmitter 100 of FIG. 1 can output only N channels. That is, each channel outputted from the optical transmitter 200 of the present invention has a reduced half-width, but exhibits an increased peak power level at the same power, as compared to that of the typical optical transmitter 100. Such effects are based on the fact that, although it has conventionally been regarded that the wider the half-width of each signal channel, the better the transmission quality, a similar transmission quality can be obtained in accordance with use of RSOAs, in spite of a reduction in half-width, as long as the same peak power level is given.

Figure 5:
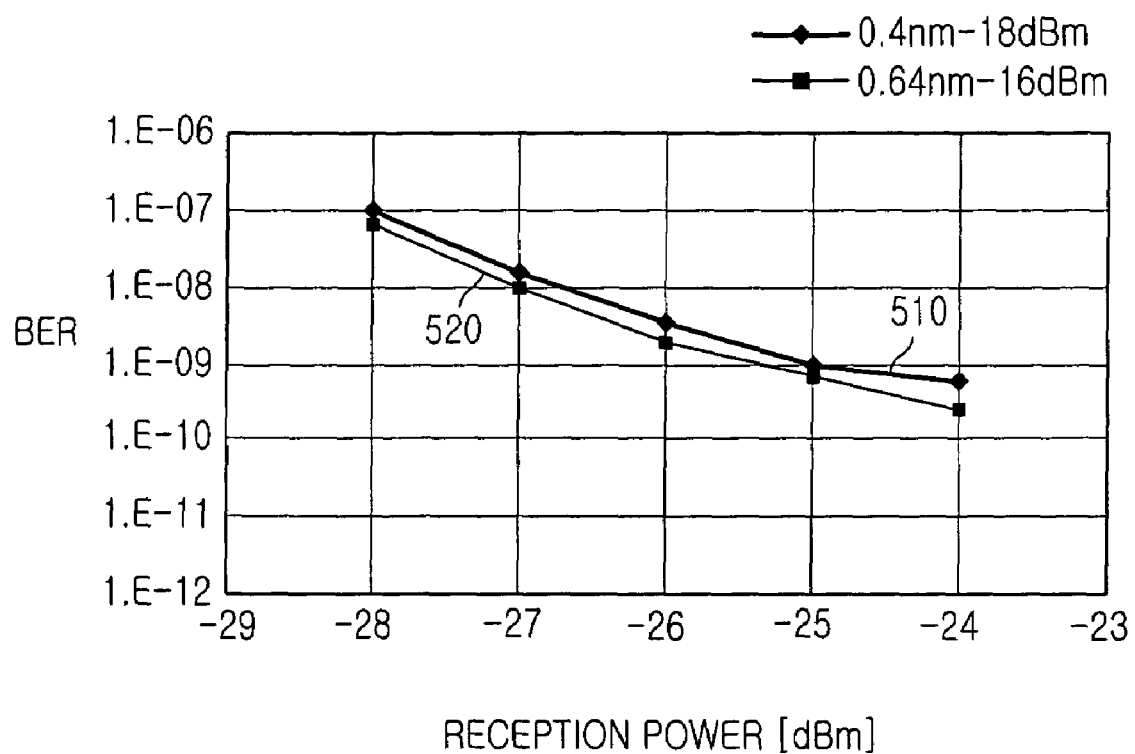
FIG. 5 is a graph showing a variation in transmission quality depending on a variation in half-width.

FIG. 5 is a graph explaining a variation in transmission quality depending on a variation in half-width. In FIG. 5, first curve 510 depicts a variation in the bit error of the first channel depending on a variation in reception power when the first channel has a half-width of 0.4 nm and a power of −18 dBm, and second curve 520 depicts a variation in the bit error of the first channel depending on a variation in reception power when the first channel has a half-width of 0.64 nm and a power of −16 dBm. Referring to FIG. 5, it can be seen that, although a variation in half-width occurs, similar bit error rates can be obtained at the same peak power level. These results may be analyzed as being based on the fact that, for example, in a WDM PON using RSOAs, the side mode suppression ratio (SMSR) to determine reception power depends on the peak power level of injection light inputted to the RSOAs. This analysis is based on an equation to derive an optical-signal-to-noise ratio (OSNR), that may be expressed as:

OSNR=58+Input Power−Noise Figure.

Figure 6:
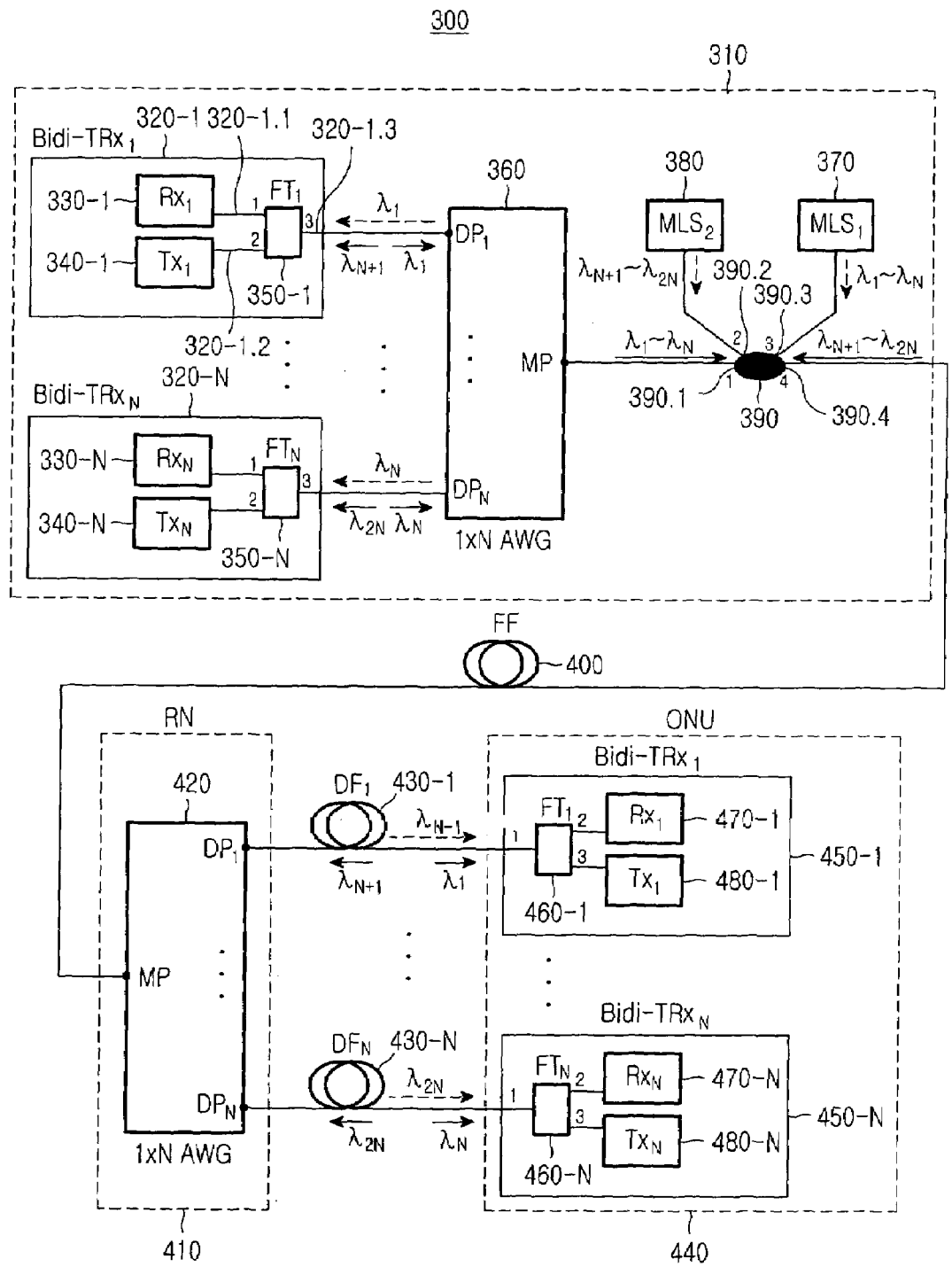
FIG. 6 is a block diagram illustrating a PON according to an exemplary embodiment of the present invention.

FIG. 6 is a block diagram illustrating a PON according to an exemplary embodiment of the present invention. As shown in FIG. 6, the PON 300 includes a central office 310, a remote node (RN) 410 connected to the central office 310 via a feeder fiber (FF) 400, and an ONU 440 connected to the remote node 410 via N distribution fibers (DFs) 430-1 to 430-N.

The central office 310 includes N bi-directional transceivers (Bidi-TRxs) 320-1 to 320-N, an AWG 360, first and second multi-lambda sources (MLSs) 370 and 380, and a coupler 390.

The N bi-directional transceivers 320-1 to 320-N are connected to the N demultiplexing ports $DP_1$ to $DP_N$ of the AWG 360, respectively. Each of the bi-directional transceivers 320-1 to 320-N includes a receiver (Rx), a transmitter (Tx), and a filter (FT). For example, the N-th bi-directional transceiver 320-N is connected to the N-th demultiplexing port $DP_N$ of the AWG 360, and includes the N-th receiver ($Rx_N$) 330-N, the N-th transmitter ($TX_N$) 340-N, and the N-th filter ($FT_N$) 350-N.

Each of the transmitters 340-1 to 340-N amplifies the associated upstream injection channel, and outputs the associated downstream signal channel with an increased peak power level. For example, the N-th transmitters 340-N amplifies the N-th upstream injection channel having the wavelength $\lambda_N$, and outputs the N-th downstream signal channel having the wavelength $\lambda_N$ with an increased peak power level. Each of the transmitters 340-1 to 340-N includes an RSOA. It is desirable for the RSOA of each transmitter to operate in a saturated state, in order to provide a lower half-width limit to the associated signal channel.

The N receivers 330-1 to 330-N receive N upstream signal channels having wavelengths $\lambda_{N+1}$ to $\lambda_{2N}$, respectively. For example, the N-th receiver 330-N receives the N-th upstream signal channel having the wavelength $\lambda_{2N}$.

Each of the filters 350-1 to 350-N has a first port 350-1.1 connected to the associated receiver, a second port 350-1.2 connected to the associated transmitter, and a third port 350-1.3 connected to the associated demultiplexing port of the AWG 360. For example, the N-th filter 350-N has a first port 350-N.1 connected to the N-th receiver 330-N, a second port 350-N.2 connected to the N-th transmitter 340-N, and a third port 350-N.3 connected to the demultiplexing port $DP_N$ of the AWG 360. Each of the filters 350-1 to 350-N receives the associated upstream injection channel at the third port, outputs the received upstream injection channel to the second port, receives the associated upstream signal channel at the third port, outputs the received upstream signal channel to the first port, receives the associated downstream signal channel at the second port, and outputs the received downstream signal channel to the third port. For example, the N-th filter 350-N receives the N-th upstream injection channel at the third port 350-N.3, outputs the received N-th upstream injection channel to the second port 350-N.2, receives the N-th upstream signal channel at the third port 350-N.3, outputs the received N-th upstream signal channel to the first port 350-N.1, receives the N-th downstream signal channel at the second port 350-N.2, and outputs the received N-th downstream signal channel to the third port 350-N.3.

The N downstream signal channels outputted from the N bi-directional transceivers 320-1 to 320-N have different wavelengths $\lambda_1$ to $\lambda_N$, respectively. The upstream injection channels inputted to the N bi-directional transceivers 320-1 to 320-N have different wavelengths $\lambda_1$ to $\lambda_N$, respectively. The upstream signal channels inputted to the N bi-directional transceivers 320-1 to 320-N have different wavelengths $\lambda_{N+1}$ to $\lambda_{2N}$, respectively. The range of the 2N wavelengths may be 25 to 200 GHz.

The AWG 360 includes N demultiplexing ports $DP_1$ to $DP_N$, and a multiplexing port MP. The multiplexing port MP of the AWG 360 is connected to a first port 390.1 of the coupler 390. The AWG 360 spectrum-slices the upstream injection light inputted to the multiplexing port MP, and outputs the resultant upstream injection channels having wavelengths $\lambda_1$ to $\lambda_N$ to the demultiplexing ports $DP_1$ to $DP_N$, respectively. For example, the AWG 360 outputs the spectrum-sliced N-th upstream injection channel having the wavelength $\lambda_N$ to the N-th demultiplexing port $DP_N$. The AWG 360 also demultiplexes upstream signal light inputted to the multiplexing port MP, and outputs the resultant upstream signal channels having wavelengths $\lambda_{N+1}$ to $\lambda_{2N}$ to the demultiplexing ports $DP_1$ to $DP_N$, respectively. For example, the AWG 360 outputs the demultiplexed N-th upstream signal channel having the wavelength $\lambda_{2N}$ to the N-th demultiplexing port $DP_N$. Also, the AWG 360 multiplexes N downstream signal channels having wavelengths $\lambda_1$ to $\lambda_N$ respectively inputted to the demultiplexing ports $DP_1$ to $DP_N$, and outputs the resultant downstream signal light to the multiplexing port MP. The transmission spectrums of the AWG 360 match the spectrums of the upstream injection light, so that there is no loss caused by mismatching of the spectrums. That is, each transmission line width of the AWG 360 is equal to or larger than the line width of each upstream injection channel.

The first multi-lambda source 370 outputs upstream injection light consisting of N upstream injection channels having different wavelengths $\lambda_1$ to $\lambda_N$, respectively, and the second multi-lambda source 380 outputs downstream injection light consisting of N downstream injection channels having different wavelengths $\lambda_{N+1}$ to $\lambda_{2N}$, respectively.

The coupler 390 has four ports 390.1 to 390.4. The first port 390.1 of the coupler 390 is connected to the multiplexing port MP of the AWG 360, the second port 390.2 is connected to the second multi-lambda source 380, the third port 390.3 is connected to the first multi-lambda source 370, and the fourth port 390.4 is connected to the feeder fiber 400. The coupler 390 receives the upstream injection light at the third port 390.3, outputs the received upstream injection light to the first port 390.1, receives the downstream injection light at the second port 390.2, outputs the received downstream injection light to the fourth port 390.4, receives the downstream signal light at the first port 390.1, outputs the received downstream signal light to the fourth port 390.4, receives the upstream signal light at the fourth port 390.4, and outputs the received upstream signal light to the first port 390.1.

The remote node 410 includes an AWG 420. The AWG 420 has a multiplexing port MP, and N demultiplexing ports $DP_1$ to $DP_N$. The multiplexing port MP of the AWG 420 is connected to the feeder fiber 400, and the demultiplexing ports $DP_1$ to $DP_N$ of the AWG 420 are connected to the distribution fibers 430-1 to 430-N, respectively. For example, the N-th demultiplexing port $DP_N$ of the AWG 420 is connected to the N-th distribution fiber 430-N. The AWG 420 spectrum-slices the downstream injection light inputted to the multiplexing port MP, and outputs the resultant downstream injection channels having wavelengths $\lambda_{N+1}$ to $\lambda_{2N}$ to the demultiplexing ports $DP_1$ to $DP_N$, respectively. For example, the AWG 420 outputs the spectrum-sliced N-th downstream injection channel having the wavelength $\lambda_{2N}$ to the N-th demultiplexing port $DP_N$. The AWG 420 also demultiplexes downstream signal light inputted to the multiplexing port MP, and outputs the resultant downstream signal channels having wavelengths $\lambda_1$ to $\lambda_N$ to the demultiplexing ports $DP_1$ to $DP_N$, respectively. For example, the AWG 420 outputs the demultiplexed N-th upstream signal channel having the wavelength $\lambda_N$ to the N-th demultiplexing port $DP_N$. Also, the AWG 420 multiplexes N upstream signal channels having wavelengths $\lambda_{N+1}$ to $\lambda_{2N}$ respectively inputted to the demultiplexing ports $DP_1$ to $DP_N$, and outputs the resultant upstream signal light to the multiplexing port MP. The transmission spectrums of the AWG 420 match the spectrums of the downstream injection light, so that there is no loss caused by mismatching of the spectrums. That is, each transmission line width of the AWG 420 is equal to or larger than the line width of each downstream injection channel.

The ONU 440 includes N bi-directional transceivers 450-1 to 450-N. The bi-directional transceivers 450-1 to 450-N are connected to the N distribution fibers 430-1 to 430-N, respectively. Each of the bi-directional transceivers 450-1 to 450-N includes a receiver (RX), a transmitter (TX), and a filter (FT). For example, the N-th bi-directional transceiver 450-N is connected to the N-th distribution fiber 430-N, and includes the N-th receiver ($RX_N$) 470-N, the N-th transmitter ($TX_N$) 480-N, and the N-th filter ($FT_N$) 460-N.

Each of the transmitters 480-1 to 480-N amplifies the associated upstream injection channel, and outputs the associated downstream signal channel with an increased peak power level. For example, the N-th transmitters 480-N amplifies the N-th upstream injection channel having the wavelength $\lambda_{2N}$, and outputs the N-th downstream signal channel having the wavelength $\lambda_{2N}$ with an increased peak power level. Each of the transmitters 480-1 to 480-N includes an RSOA. It is desirable for the RSOA of each transmitter to operate in a saturated state, in order to provide a lower half-width limit to the associated signal channel.

The N receivers 470-1 to 470-N receive N upstream signal channels having wavelengths $\lambda_{N+1}$ to $\lambda_{2N}$, respectively. For example, the N-th receiver 470-N receives the N-th upstream signal channel having the wavelength $\lambda_{2N}$.

Each of the filters 460-1 to 460-N has a first port connected to the associated distribution fiber, a second port connected to the associated receiver, and a third port connected to the associated transmitter. For example, the N-th filter 460-N has a first port 460-N1 connected to the N-th distribution fiber 430-N, a second port 460-N2 connected to the N-th receiver 470-N, and a third port 460-N3 connected to the N-th transmitter 480-N. Each of the filters 460-1 to 460-N receives the associated downstream injection channel at the first port, outputs the received downstream injection channel to the third port, receives the associated upstream signal channel at the third port, outputs the received upstream signal channel to the first port, receives the associated downstream signal channel at the first port, and outputs the received downstream signal channel to the second port. For example, the N-th filter 460-N receives the N-th downstream injection channel at the first port 460-N1, outputs the received N-th downstream injection channel to the third port 460-N3, receives the N-th upstream signal channel at the third port 460-N3, outputs the received N-th upstream signal channel to the first port 460-N1, receives the N-th downstream signal channel at the first port 460-N1, and outputs the received N-th downstream signal channel to the second port 460-N2.

As apparent from the above description, the bi-directional transceiver according to the present invention and the PON using the bi-directional transceiver can achieve maximal energy efficiency because they use multi-lambda sources.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. An optical transmitter comprising:
   a multi-lambda source to output injection light consisting of a plurality of injection channels;
   a circulator having a first port, a second port, and a third port, the circulator receiving the injection light at the first port, outputting the received injection light to the second port, receiving signal light at the second port, and outputting the received signal light to the third port;
   an arrayed waveguide grating having a multiplexing port connected to the second port of the circulator, and a plurality of demultiplexing ports, the circulator receiving the injection light at the multiplexing port, spectrum-slicing the received injection light into a plurality of injection channels, and outputting the injection channels to the demultiplexing ports, respectively, and receiving a plurality of signal channels at the demultiplexing ports, respectively, multiplexing the received signal channels into signal light, and outputting the signal light to the multiplexing port; and
   a plurality of reflective semiconductor optical amplifiers connected to the demultiplexing ports of the arrayed waveguide grating, each of the reflective semiconductor optical amplifiers receiving an associated one of the injection channels, and amplifying the associated injection channel to generate an associated one of the signal channels, wherein the arrayed waveguide grating has a transmission line width equal to or larger than a line width of each injection channel.

2. The optical transmitter according to claim 1, wherein each of the reflective semiconductor optical amplifiers operates in a saturated state.

3. A passive optical network comprising:
   a central office comprising:
      a first multi-lambda source to output upstream injection light consisting of a plurality of upstream injection channels;
      a first arrayed waveguide grating to receive the upstream injection light, operable to spectrum-slice the received upstream injection light into upstream injection channels, to receive a plurality of downstream signal channels, to multiplex the received downstream signal channels into downstream signal light; and
      a first group of reflective semiconductor optical amplifiers, each to receive an associated one of the upstream injection channels, operable to amplify the associated upstream injection channel to generate an associated one of the downstream signal channels;

a remote node connected to the central office via a feeder fiber, the remote node comprising:

a second arrayed waveguide grating operable to receive the downstream signal light, and to demultiplex the received downstream signal light into the downstream signal channels; and an optical network unit connected to the remote node via a plurality of distribution fibers to receive the downstream signal channels, respectively, wherein the first arrayed waveguide grating has a transmission line width equal to or larger than a line width of each upstream injection channel.

4. The passive optical network according to claim 3, wherein each of the first-group reflective semiconductor optical amplifiers operates in a saturated state.

5. The passive optical network according to claim 3, wherein the optical network unit comprises: a second group of reflective semiconductor optical amplifiers, each operable to receive an associated one of the downstream injection channels, and to amplify the associated downstream injection channel to generate an associated one of the upstream signal channels.

6. The passive optical network according to claim 3, wherein the central office further comprises: a second multi-lambda source to output downstream injection light consisting of a plurality of downstream injection channels.

7. The passive optical network according to claim 3, wherein the second arrayed waveguide grating receives the downstream injection light, demultiplexes the received downstream injection light into the downstream injection channels, and outputs the downstream injection channels to the optical network unit.

8. The passive optical network according to claim 3, wherein the first arrayed waveguide grating has a transmission line width equal to or larger than a line width of each upstream injection channel.

9. The passive optical network according to claim 3, wherein each of the first-group reflective semiconductor optical amplifiers operates in a saturated state.

* * * * *

UNITED STATES PATENT AND TRADEMARK OFFICE
CERTIFICATE OF CORRECTION

PATENT NO. : 7,398,021 B2 Page 1 of 1
APPLICATION NO. : 11/052400
DATED : July 8, 2008
INVENTOR(S) : Hong-Seok Shin et al.

It is certified that error appears in the above-identified patent and that said Letters Patent is hereby corrected as shown below:

Title Page
Item [73], Assignee's address, should read as follows:

--...Yeongtong-Gu...--

Signed and Sealed this

Twenty-sixth Day of August, 2008

JON W. DUDAS
*Director of the United States Patent and Trademark Office*